(12) United States Patent
Smith

(10) Patent No.: US 9,582,691 B2
(45) Date of Patent: Feb. 28, 2017

(54) SIMULTANEOUS PROGRAMMING OF SELECTED TAGS

(71) Applicant: Alien Technology Corporation, Morgan Hill, CA (US)

(72) Inventor: John Stephen Smith, San Jose, CA (US)

(73) Assignee: Ruizhang Technology Limited Company, Shanghai (CN)

( * ) Notice: Subject to any disclaimer, the term of this patent is extended or adjusted under 35 U.S.C. 154(b) by 220 days.

(21) Appl. No.: 14/340,457

(22) Filed: Jul. 24, 2014

(65) Prior Publication Data

US 2014/0333420 A1    Nov. 13, 2014

Related U.S. Application Data

(63) Continuation-in-part of application No. 13/355,432, filed on Jan. 20, 2012, now Pat. No. 9,405,941.

(60) Provisional application No. 61/859,142, filed on Jul. 26, 2013.

(51) Int. Cl.
    *G06K 7/01*    (2006.01)
    *G06K 7/10*    (2006.01)
(52) U.S. Cl.
    CPC ................. *G06K 7/10009* (2013.01)
(58) Field of Classification Search
    CPC .................................................. G06K 7/10009

USPC ....................................................... 340/10.51
See application file for complete search history.

(56) References Cited

U.S. PATENT DOCUMENTS

| | | | | |
|---|---|---|---|---|
| 5,673,037 | A * | 9/1997 | Cesar | G06K 7/0008 235/385 |
| 5,942,987 | A * | 8/1999 | Heinrich | G06K 7/0008 340/10.42 |
| 6,288,629 | B1 | 9/2001 | Cofino et al. | |
| 7,562,083 | B2 | 7/2009 | Smith et al. | |
| 2007/0024426 | A1 * | 2/2007 | Akiyama | G06K 19/0723 340/10.5 |
| 2008/0204195 | A1 * | 8/2008 | Diorio | G06F 21/554 340/10.1 |
| 2008/0211637 | A1 * | 9/2008 | Smith | G06Q 20/3278 340/10.42 |

* cited by examiner

*Primary Examiner* — Edwin Holloway, III
(74) *Attorney, Agent, or Firm* — Blakely, Sokoloff, Taylor & Zafman, LLP

(57) ABSTRACT

An apparatus and method for simultaneous programming of data to individually addressed Tags. Tags contain a being addressed indicator that allows for processing of simultaneous programming commands. Specified Tags are individually pre-addressed to receive simultaneous programming. Tag data is programmed simultaneously for all Tags in a specified group of Tags. Data is individually verified for each specified Tag in the group of Tags and verification includes tracking a command counter for each specified Tag.

26 Claims, 6 Drawing Sheets

SIMULTANEOUS PROGRAMMING OF SELECTED TAGS

This application is related to co-pending U.S. Provisional Application No. 61/859,142 filed on Jul. 26, 2013, and this application claims the benefit of the provisional's filing date under 35 U.S.C. §119(e) and is hereby incorporated herein by reference in its entirety; this application is also a continuation-in-part of co-pending U.S. application Ser. No. 13/355,432 filed on Jan. 20, 2012.

FIELD OF THE INVENTION

The present invention relates to radio frequency identification (RFID) Tags, and more particularly methods and apparatuses for writing data to such Tags.

BACKGROUND INFORMATION

Radio frequency identification (RFID) is a technology that incorporates the use of signals in the radio frequency (RF) portion of the electromagnetic spectrum to uniquely identify a Tag. Interrogating transmitters (e.g., interrogators, programmers, or readers) are able to interrogate (read) information from wireless Tags by sending a command to a Tag and receiving a response. Some interrogators (programmers) are able to program Tag memory in addition to reading Tag responses.

It is desirable to program groups of Tags in the most efficient method possible. Time to program is especially important when dealing with thousands of Tags (e.g., Tags on products in a warehouse). Large numbers of Tags should be programmed in the shortest amount of time possible, particularly if Tags are presented in large batches (e.g., a container full products with Tags to be programmed). However, there are limitations with existing technology, specifically in trying to program a large group of Tags in a short amount of time.

Tags can be manufactured with programmable memory to store data (e.g., serial number, model number, and other object characteristics). An interrogator (programmer) can initialize a Tag's memory based on individual application requirements. For example, a unique identification number can be encoded on the Tag by the manufacturer of a given product immediately before a Tag's application to the product packaging. In other situations, more data is programmed into a Tag's memory. For example, a manufacturer of televisions that uses Tags to track televisions through their supply channels may want to also specify the make, model, color, size and/or other details of their televisions into each Tag. With a re-writable Tag, data can be changed, added or deleted at various points in a Tag's life cycle. Unfortunately, writing to a large amount of Tags, especially very low cost passive Tags, may take a relatively long time depending on the method of programming the Tags.

One method to program a Tag is individual programming of each Tag. However, each Tag must be provided with power over a period of time when the memory is being programmed. Programming memory of a passive RFID Tag requires a relatively long programming time interval, during which the reader transmits the power required to program a Tag's memory. The time to program a Tag's memory can be ten microseconds or more. In inventory management applications, such as Tag systems used in warehouses, thousands of tagged objects may be within a single reader's RF field, which can be several meters in radius. For example, a single pallet of tagged objects can have more than one hundred cases each containing dozens of tagged objects.

Another method of programing Tags is to broadcast a write command to all Tags within range that programs the same data to all Tags within range of the command. One limitation with broadcasting to all Tags within range is that it is not possible to specify particular Tags and write only to those Tags. With a broadcast write for example, all Tags within range will receive and act on the broadcast command to write. Another limitation with broadcasting to all Tags is the inability to verify the data written to each individual Tag when multiple Tags respond at the completion of the programming. For example, an interrogator issuing a broadcast write command to ten Tags will receive ten responses to the command. Write responses sent at the same time will collide and become indecipherable to an Interrogator. Furthermore, with a broadcast command, an interrogator is unable to program unique data specific to each Tag in a population. A broadcast write, for example, writes the same data to all Tags receiving the command.

Another method to program Tags uses an intent to write flag to tell Tags that a programming command is about to be sent. In order to write data to Tags with this method, Tags must first be programmed with an intent to write, which also can require ten microseconds. After the intent to write is saved to memory, a simultaneous write can be initiated. However, because writing the intent to write often takes the same amount of time as programming the Tags with the final data to be written to memory, the process is not very efficient. Furthermore, the intent to write flag needs to be verified before a write can start, and the intent to write flag must be cleared after the write is complete. Therefore, the intent to write flag has inherent inefficiencies that extend the time to program multiple Tags.

It is desirable to write data to wireless Tags efficiently, especially in cases where many need to be programmed in a short amount of time.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention.

However, in certain instances, well-known or conventional details are not described in order to avoid obscuring the description of the present invention. The term "coupled" as used herein, may mean directly coupled or indirectly coupled through one or more intervening components. References to one or an embodiment in the present disclosure are not necessarily references to the same embodiment, and such references mean at least one.

Figure 1:
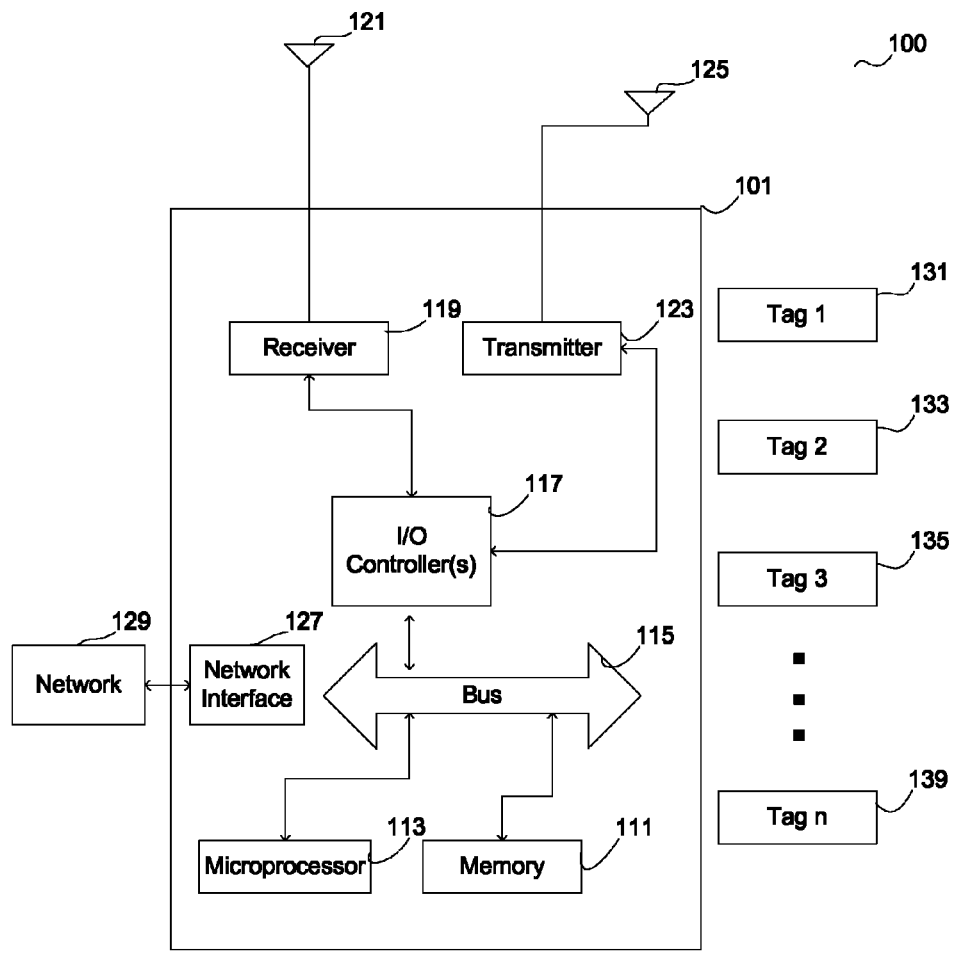
FIG. 1 illustrates one embodiment of an identification system that includes an Interrogator and a plurality of RF Tags.

FIG. 1 illustrates an example of a Tag programming system 100 which includes the Interrogator 101 and a plurality of Tags 131, 133,135, . . . and 139. In one embodiment, the Interrogator 101 integrates a programmer and reader in one device. In one embodiment, the Tag programming system uses a reader-talks first RFID system using either passive or semi-passive active backscatter transponders as Tags. The incorporation of a battery into a Tag is an expanded feature to facilitate longer read range; however, the use of the battery does require certain tradeoffs, such as higher costs, limited longevity, larger form factor, greater weight and end-of-life disposal requirements. Thus, the Tags 131-139 may have a battery or not. It will be appreciated that different types of Tags may be mixed in a system where a Interrogator is interrogating Tags with batteries and Tags without batteries. There are at least 4 classes of Tags which may be used with the present invention:

(I) no power source on the Tag except for power which is obtained from the Tag's antenna, and includes one-time programmable memory which can store the Tag's identification code and may include factory programmed memory, (II) a Tag without a power source on the Tag except for power which is obtained from the Tag's antenna, but when powered from the Interrogator, can write, erase, or rewrite data to non-volatile memory in the Tag; this type of Tag may also include one time programmable memory, and the Tag's identification code can be in any of these. (III) a Tag with a small battery to provide power to the circuitry in the Tag. Such a Tag may also include non-volatile memory as well as storing the Tag's identification code or other data, and other types of memory such as factory programmed memory and write once memory, and (IV) a Tag which can communicate with other Tags or other devices.

The Interrogator 101 typically includes a receiver 119 and a transmitter 123, each of which is coupled to an I/O (input/output) controller 117. The receiver 119 may have its own antenna 121, and the transmitter 123 may have its own antenna 125. It will be appreciated by those in the art that the transmitter 123 and the receiver 119 may share the same antenna. The receiver 119 and the transmitter 123 may be similar to conventional receiver and transmitter units found in current Interrogators. The receiver and transmitter typically operate, in North America, in a frequency range of about 900 megahertz. In other embodiments, the range is about 2400 megahertz. It will be appreciated, however, that the operation of the RFID system disclosed herein is not dependent upon the specific operating frequency. The receiver and transmitter are coupled to the I/O controller 117 that controls the receipt of data from the receiver and the transmission of data, such as commands, from the transmitter 123. The I/O controller is coupled to a bus 115 that is in turn coupled to a microprocessor 113 and a memory 111. There are various different possible implementations that may be used in the Interrogator 101 for the processing system represented by elements 117, 115, 113 and 111. In one implementation, the microprocessor 113 is a programmable microcontroller, such as an 8051 microcontroller or other well-known microcontrollers or microprocessors (e.g., an ARM microprocessor) and the memory 111 includes dynamic random access memory and a memory controller that controls the operation of the memory. Memory 111 may also include a non-volatile read only and/or re-writable memory for storing data and software programs. The memory 111 typically contains a program that controls the operation of the microprocessor 113 and also contains data used during the processing of Tags as in the interrogation of Tags. In one embodiment further described below, the memory 111 includes a computer program which causes the microprocessor 113 to send programming commands through the I/O controller to the transmitter and to receive responses from the Tags through the receiver 119 and through the I/O controller 117. In one embodiment further described below, the memory 111 includes instructions for creating and maintaining a queue or list of Tags to be programmed. The Interrogator 101 may also include a network interface 127, such as an Ethernet interface, which allows the Interrogator 101 to communicate to other processing systems through a network 129. The network interface 127 may be coupled to the bus 115 so that it can receive data, such as the list of Tags identified in an interrogation from either the microprocessor 113 or from the memory 111.

In one embodiment the Interrogator 101 implements noise cancellation using a directional coupler and reflection circuitry. The directional coupler electrically couples by a partial and predetermined amount a signal at one port out through another port. The reflection circuit provides variable attenuation and variable phase shift of the transmit signal to generate a canceling signal. The canceling signal is summed with a received signal to cancel or diminish unmodulated reflections of the transmit signal.

Figure 2:
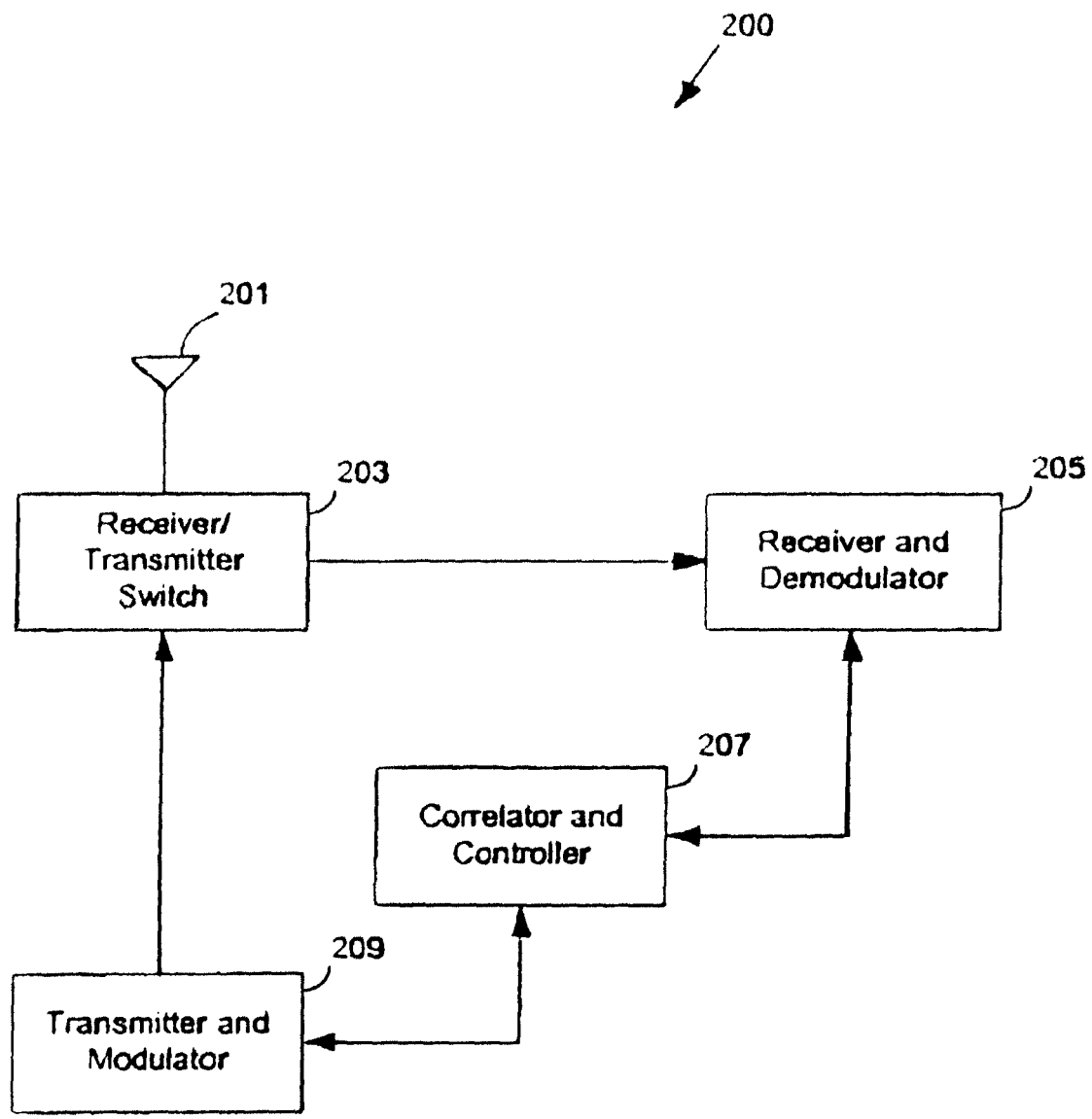
FIG. 2 illustrates an example of one implementation of a Tag that may be used with at least one embodiment of the present invention.

FIG. 2 illustrates an example of one implementation of a Tag that may be used with at least one embodiment of the present invention. The Tag 200 includes an antenna 201 that is coupled to the receiver and demodulator 205 and to the backscatter modulator 209. A correlator and controller unit 207 is coupled to the receiver and demodulator 205 and to the backscatter modulator 209. The particular example shown in FIG. 2 of a Tag may be used in various embodiments in which a memory for maintaining data between commands is maintained in the Tag and in which a bit by bit (or larger data chunk) correlation occurs in the Tag. The receiver and demodulator 205 receives signals through the antenna 201 and the switch 203, demodulates the signals, and provides these signals to the correlator and controller unit 207. Commands received by the receiver 205 are passed to the controller of the unit 207 in order to control the operation of the Tag. Data received by the receiver 205 is also passed to the control unit 207, and this data may include parameters for commands in the embodiments described below. The backscatter modulator 209, under control of the control unit 207, modulates the input impedance of the Tag corresponding to responses or other data through the antenna 201 to the Interrogator 101. It will be appreciated by those in the art that the modulation of the impedance of the chip to the antenna 201 will result in reflection changes at the interrogator which can be demodulated to extract the data sent by the Tag.

In one embodiment of the present invention, Tags are designed with properties such as a small Integrated Circuit (IC) area to permit low cost, small memory and non-precision timing requirements. In one embodiment, atomic transactions are used to minimize Tag state storage requirements. However, in other embodiments, other Tag designs can be used. Further, it is understood that the method for simultaneous programming of specified Tags according to embodiments of the present invention can also be used in other similar situations.

Figure 3:
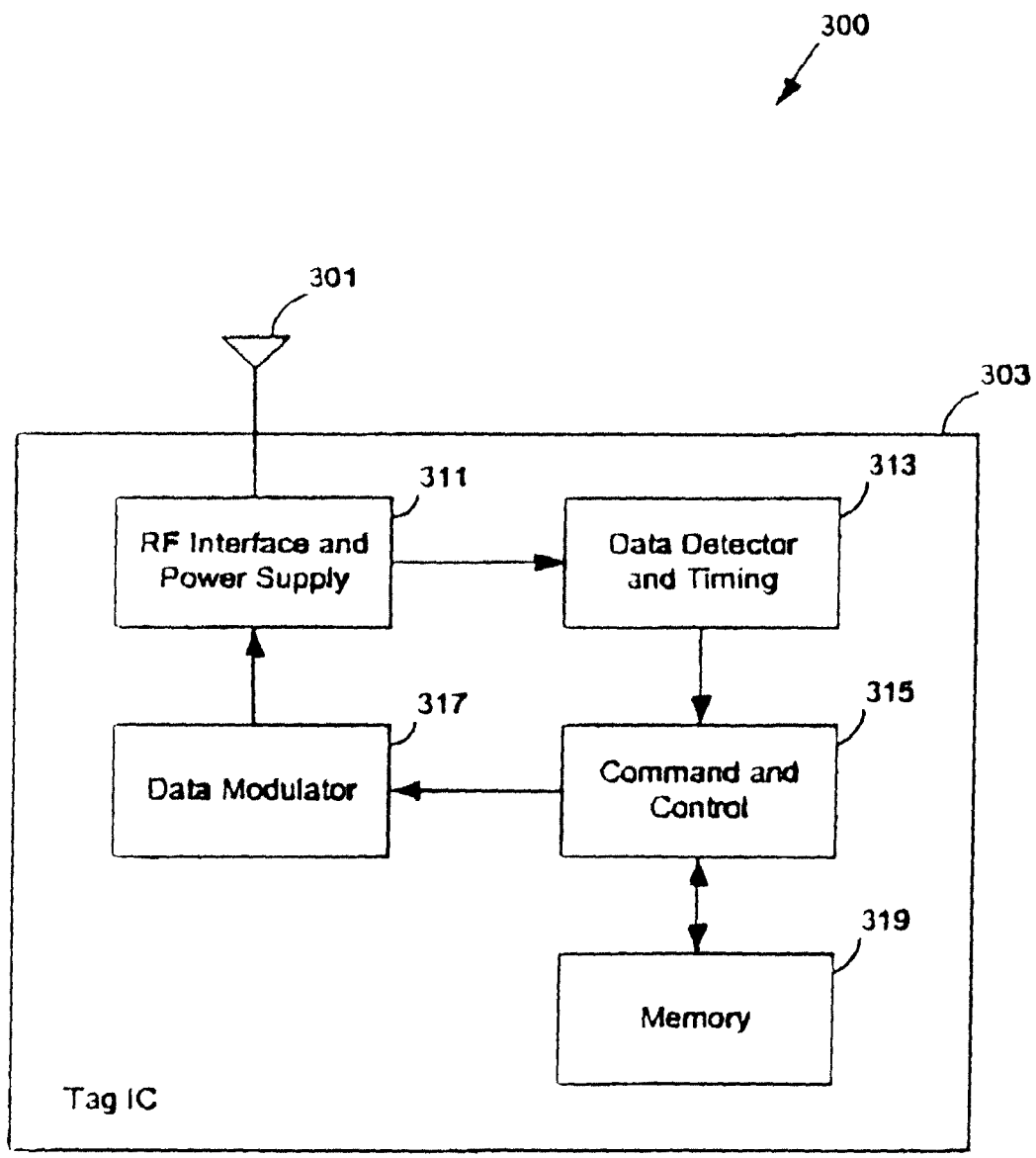
FIG. 3 illustrates an example of an RF Tag according to one embodiment of the present invention.

FIG. 3 illustrates an example of an RF Tag according to one embodiment of the present invention. In one embodiment, a VLC (Very Low Cost) Tag 300 includes an antenna 301 and an integrated circuit (IC) 303, connected together. The IC implements a command protocol and contains the Tag's identity code, which may be an electronic product code (EPC™) conforming to a Tag data standard such as the TAG Data Standard promulgated by the Tag Data Standard Working Group of EPCGlobal. The antenna 301 receives interrogation signals and reflects the interrogation signal back to the Interrogator 101 in response to a modulation signal created by the IC 303. The Tag IC 303 may comprise an RF interface and power supply 311, data detector and timing circuit 313, command and control 315, data modulator 317 and memory 319. In one embodiment, command and control 315 includes static logic which implements the simultaneous programming according to embodiments of the present invention.

In one embodiment, the RF Interface and Power Supply 311 converts the RF energy into the DC power required for the Tag IC 303 to operate, and provides modulation information to the Data Detector and Timing circuit 313. Alternatively, power may be supplied by a battery or harvested power source. The data detector and timing block 313 de-modulates the reader signals and generates timing and data signals used by the control logic 315. The RF interface also provides a means of coupling the Tag modulation signals to the antenna for transmission to the Interrogator 101. The Data Detector and Timing circuit 313 de-modulates the Interrogator 101 signals and generates timing and data signals used by the command and control logic 315. The command and control logic 315 coordinates all of the functions of the Tag IC 303. The command and control logic 315 may include state logic to interpret data from the Interrogator 101, perform the required internal operations and determine if the Tag will respond to the Interrogator 101. The command and control logic 315 implements multiple Tag states and the communications protocol according to embodiments described below. The Tag memory 319 may contain the EPC™ code of the item tagged by a VLC Tag. The Tag memory 46 may contain a unique identification code or a non-unique identification code. The Tag memory may also contain a checksum that may be used for error detection. The data modulator 317 translates the binary Tag data into a signal that is then applied to the RF Interface 311 and then transmitted to the Interrogator 101. In one embodiment, the signal applied to the RF Interface 311 is transmitted via the antenna 301.

The design and implementation of the Tags can be characterized in layers. For example, a physical and environmental layer characterizes the mechanical, environmental, reliability and manufacturing aspects of a Tag; a radio frequency (RF) transport layer characterizes RF coupling between Readers and Tags; and a communication layer characterizes communications/data protocols between Readers and Tags. Various different implementations of Tags at different layers can be used with embodiments of the present invention. It is understood that the implementations of the Tags are not limited to the examples shown in this description. Different Tags or communication devices can use methods of the embodiments of the present invention for communication according to the needs of the target application.

In one embodiment of the invention, a Tag may be fabricated through a fluidic self-assembly process. For example, an integrated circuit may be fabricated with a plurality of other integrated circuits in a semiconductor wafer. The integrated circuit will include, if possible, all the necessary logic of a particular RF Tag, excluding the antenna 301. Thus, all the logic shown in the Tag 300 would be included on a single integrated circuit and fabricated with similar integrated circuits on a single semiconductor wafer. Each circuit would be programmed with a unique identification code and then the wafer would be processed to remove each integrated circuit from the wafer to create blocks that are suspended in a fluid.

The fluid is then dispersed over a substrate, such as a flexible substrate, to create separate RF Tags. Receptor regions in the substrate would receive at least one integrated circuit, which then can be connected with an antenna on the substrate to form an RF Tag.

As described above it is advantageous to program Tags in the most efficient way possible. One bottleneck in programming Tags is the time to commit data to memory. Committing data to memory requires power to be provided to the Tag continuously for ten microseconds or more depending on the Tag design.

Pre-Programming Tags

In one embodiment, Tag memory includes logically separated and distinct banks. In one embodiment, Tag memory is separated into Reserved memory, User memory, EPC memory, and TID memory. Reserved memory contains kill and or access passwords if passwords are implemented in a Tag. User memory allows for user specific data storage. EPC memory contains the EPC data that is used to identify the object that a Tag is affixed. In one embodiment, the TID memory is read only memory pre-populated with a unique Tag ID before distribution from the Tag manufacturer. A Tag ID in TID memory can be unique number used to uniquely identify a Tag as well as the object that the Tag is affixed. In other embodiments, Tag memory includes additional types of memory banks in addition to or instead of the previously mentioned banks.

A purchaser or user of a Tag may want to program a Tag memory bank based on specific usage requirements. For example, a manufacturer of televisions may want to program their manufacturer name, model of television, color, size, and other identifying characteristics into a Tag before using the Tag to mark and track their product.

In one embodiment, one or more portions of a Tag's memory are pre-programmed by the Tag manufacturer before the Tags are sent to the end user (e.g., before a warehouse store, product manufacturer uses the Tags in their supply chain or other user). In one embodiment, the Tag is pre-programmed with one or both of a unique serial number and unique Tag ID. The unique serial number may be incorporated into a product number or EPC. The unique Tag ID may be used to determine unique identification of a Tag or associated object in addition to or instead of the unique serial number. In one embodiment, the unique Tag ID is programmed into a TID memory bank, and the unique serial number is programmed into the EPC memory bank. Pre-programming of the serial number and Tag ID by the Tag manufacturer can reduce the total amount of programming needed for end users. For example, Company XYZ wants to program specific identifying characteristics into the Tag (e.g., product color, model number, and other features of their product). Company XYZ has large groups of products with identical characteristics. Without pre-programming Tags, Company XYZ must spend the required time to individually program each Tag with a unique serial number or other unique identifier as well as the product color and model number. By taking advantage of Tag manufacturer pre-programming, Company XYZ need only program their product color and model number into each Tag, speeding up their overall time to completely program their Tags. In this example, the color and model number is identical for a large batch of products, and Company XYZ will program the exact same color and model for many Tags. Because the Tags that Company XYZ received from the Tag manufacturer are pre-programmed with at least one unique identifier, only the identical characteristics (e.g., color and model number) need to be added to the Tag data. In the case of manufacturer pre-programming of unique Tags, an end user can simultaneously program the same data (e.g., color and model number) for a group of Tags and avoid writing unique data to each Tag. In one embodiment, unique data (e.g., serial number or unique Tag ID) is simultaneously programmed to each Tag using the simultaneous programming operation discussed further below.

Tag Inventory

In one embodiment, the Interrogator 101 inventories the current population of Tags before transmitting a simultaneous programming command. Performing an inventory of a population of Tags is useful in determining the serial numbers, Tag IDs, Tag types, Tag class, data characteristics, and number of Tags in the field. In one embodiment, after determining the population of Tags, the Interrogator 101 specifies a group of Tags from the entire population of Tags to prepare for simultaneous programming. In some cases the Interrogator 101 skips the initial inventory, for example, when a user manually inputs a set of Tags or a list of Tags are already populated in Interrogator memory 111.

There are various methods for scanning a population of Tags to determine individual characteristics of a Tag. In one embodiment, the RFID Tag has one or more sessions (e.g., session 0-3). Each session is capable of storing a state with two values (e.g., state A and state B). In one embodiment one state may be a persistent state and the other state may be a transient state. The Interrogator uses a series of coded interrogation signals to search a population of Tags. The search may be a random search or a binary tree search that systematically classifies and separates groups and subgroups that match more and more specific search criteria.

In one embodiment, the Interrogator 101 inventories Tags with one or more inventory commands (e.g., Query, ACK, and NAK). A Query command initiates and specifies an inventory round to which one or more Tags respond with a 16-bit number. If the Interrogator 101 successfully extracts a 16-bit number, it is sent back to the Tag for handshaking through an ACK command. A Tag responds if the 16-bit number sent by the ACK command matches the number that the Tag sent. A Tag that has its 16-bit number confirmed then replies with a prefix, its CRC (Cyclic Redundancy Check) and its EPC (Electronic Product Code). In other embodiments, the number can be in a range of 8 to 64 bits. The Tag then transitions its internal state for that session from A to B (or from B to A) unless it gets a NAK. If it receives a NAK, it stays in the former state. An Interrogator can discover Tags in a Tag population and transition the internal state of all discovered Tags. In other embodiments, the Interrogator 101 uses other inventory commands, operations, or methods to inventory a Tag population. In one embodiment, a Tag has four sessions available, each with a single bit of independent state memory. This session structure allows four Interrogators or processes to communicate with a Tag population in a multitasking environment, however other embodiments can allow for more than four Interrogators.

Specifying Individual Tags To Program

In one embodiment, inventoried Tags are added to the Interrogator's memory, and groups of specified Tags are chosen from a population of inventoried Tags. In one embodiment, inventoried Tags are represented in the Interrogator 101 as a queue or list of Tags.

In one embodiment, the Interrogator 101 can specify individual Tags to add to a simultaneous programming group by specifying a Tag's serial number or unique Tag ID. Tag serial number and unique Tag ID may be discovered in an initial inventory phase or the Interrogator 101 may have a pre-populated list of Tags for programming. In one embodiment, the Interrogator 101 can automatically group individual Tags for programming based on programming interval, class of Tag, data stored in Tag memory, or other characteristic. For example, the Interrogator 101 can select groups of only class II Tags for programming, or can select groups of Tags with serial numbers in a defined range. In other embodiments, a user can manually choose a group of Tags for simultaneous programming. In one embodiment a user can use a Tag serial number or unique Tag ID to specify individual Tags to add to a simultaneous programming group.

In one embodiment, a group of Tags specified for simultaneous programming contains two or more Tags. In one embodiment, the Interrogator 101 can specify a single group of four hundred or more Tags for simultaneous programming and simultaneously programs the group according to the methods described below. In one embodiment, after programming, Tags are individually verified for the success of the programming. Successfully programmed Tags are removed from the list or queue of Tags to be programmed and the next group of Tags is specified. The Interrogator 101 continues programming specified groups of Tags until no more Tags remain to be programmed. In one embodiment, when there are no more groups of Tags to program, the Interrogator 101 provides a completed status message and records the completion of the programming to the Interrogator's internal memory.

Different types of Tags may require different durations of time to commit data to memory. The time required to commit data to memory may also be referred to as the programming interval and may be directly related to the amount of time required for Tags to receive constant power during programming. For example, some Tags can commit data to Tag memory with ten microseconds or less of constant power, while other Tags may require twenty microseconds or more of constant power in order to commit data to a Tag's memory. The maximum number of Tags that the Interrogator 101 can program in a group may depend on the duration of time the Interrogator 101 can maintain communication and power to a group of Tags. For example, local wireless frequency regulations may require the Interrogator 101 to limit the duration of time spent communicating with and powering to a group of Tags. In one embodiment, the Interrogator 101 determines a total duration of time allowed for communicating with and powering a group of Tags and automatically queues a number of Tags that can be successfully programmed in the given time.

In one embodiment, during an inventory, the Interrogator 101 stores details about each Tag. An Interrogator can determine the various characteristics of Tags in the population of Tags and can group Tags by specific characteristic. In one embodiment, the Interrogator 101 can group Tags based on the minimum time required for the Tag to commit data to memory. For example, a population of Tags may be mixed with Tags requiring ten microseconds to program as well as Tags requiring twenty microseconds to program. In one embodiment, the Interrogator 101 sets the programming interval to at least twenty microseconds and programs the entire population with a programming interval of at least twenty microseconds. In another embodiment, the Interrogator 101 groups Tags that require a programming interval of ten microseconds together in one or more simultaneous programming groups separate from the group(s) requiring twenty microseconds. In another embodiment, the Interrogator 101 determines the longest programming interval required from all the Tags to be programmed and uses the longest programming interval as the default programming interval for programming all the Tags. In one embodiment, the Interrogator 101 uses each Tags's programming interval requirements to maximize the number of Tags that can be programmed in one group before having to switch frequencies.

BeingAddressed Indicator

Tags are manufactured with numerous states that control a Tag's response to commands. For example, EPC Gen 2 Tags contain the ready, acknowledged, open, and secure states (as well as other states). The logic of a Tag determines the behavior of the various Tag states. For example, the ready state and the kill state are two states that a Tag can enter upon powering up. A Tag in the ready state does not participate in an inventory round. The open state and secure states are used by access commands (commands which read from or write to a Tag). The open state can execute all access commands except Lock and BlockPermalock. The secure state can execute all access commands.

In one embodiment, each tag contains a BeingAddressed indicator. In one embodiment, the BeingAddressed indicator is a flag or bit that can be set in the memory of a Tag. In one embodiment, activating/setting a BeingAddressed indicator is accomplished by changing a Tag's BeingAddressed bit from 0 to 1. In other embodiments, the BeingAddressed indicator can be implemented and manipulated in other ways.

In one embodiment, a Tag with an activated/set BeingAddressed indicator can maintain an addressable state while the Interrogator 101 continues to promote other Tags to an addressable state. Further details of the operation of simultaneous programming commands are discussed below.

Tags that do not have a BeingAddressed indicator or have an inactive indicator, can only be addressed one at a time because Tags change their state when they receive a command to address a different Tag. For example, without a BeingAddressed indicator, a command to address the memory of Tag A causes nearby Tags B, C, and D to exit their addressable state.

In one embodiment, open or secure states with an activated/set BeingAddressed indicator are able to receive and process simultaneous programming commands In one embodiment, simultaneous programming commands include commands to address and prepare data for programming as well as commands to commit data to memory. Simultaneous programming commands are discussed in greater detail further below.

In one embodiment, activating/setting the BeingAddressed indicator in the open or secure state transitions the state to separate and independent OpenAddressed or SecureAddressed states. In other embodiments, activating/setting the BeingAddressed indicator in the open or secure state does not change the existing state, but does allow a group of Tags to receive and process simultaneous programming commands It will be evident to one of skill in the art, that other states may also be modified to include a BeingAddressed indicator.

In one embodiment, a Tag also contains a BeingAddressed independent Tag state separate from the states described above, and separate from a BeingAddressed indicator associated with an open or secure state. In one embodiment, the BeingAddressed state also allows for a Tag to receive and process simultaneous programming commands. In one embodiment, a Tag receives a command to switch to the BeingAddressed state in order to receive and process simultaneous programming commands sent to a group of Tags. In one embodiment, Tags are placed in the BeingAddressed state before simultaneous programming commands are sent. In one embodiment, a Tag in the BeingAddressed state stays in the BeingAddressed state until a signal is received to exit the BeingAddressed state (e.g., from a query or NAK command).

In one embodiment, unlike an open state or the secure state, the BeingAddressed state does not respond to programming commands with backscatter replies. In one embodiment, while in the BeingAddressed state, Tags receive programming commands and do not reply with any error reporting. In one embodiment, to verify successful simultaneous programming, the Interrogator 101 issues independent verification to each Tag as described further below.

In one embodiment, a Tag is not permitted to enter the BeingAddressed state upon powering up. In an exemplary embodiment, Tags to be programmed are transitioned to the state of BeingAddressed during the inventory process. In other embodiments, Tags to be programmed are in an acknowledged state (or other state) after an inventory process and then transitioned to the BeingAddressed, OpenAddressed, or SecureAddressed state by the Interrogator 101. In one embodiment, Tags that have not transitioned to the BeingAddressed, OpenAddressed, or SecureAddressed state are unable to receive and process simultaneous programming commands.

Programming Selected Tags

In one embodiment, Tags in a BeingAddressed, OpenAddressed or SecureAddressed states are able to receive simultaneous programming commands. In one embodiment, unique data is simultaneously programmed to a group of Tags using a two-command operation: 1) a command for addressing specified tags and transmitting data to be programmed to the specified Tags, and 2) a command for committing the addressed data for the group of specified Tags.

In another embodiment, identical data is simultaneously addressed and programmed to a group of Tags with one command rather than a two-command operation.

In one embodiment, there are at least three types of simultaneous programming commands BulkProgram commands program the same/identical data (e.g., the same color and model number of a product) to a group of Tags. ProgramSetup and ProgramCommit commands that program unique data to each Tag in a group of specified Tags (e.g., a unique serial number). It will be evident to one of skill in the art that it is optional whether data is actually unique when using the ProgramSetup and ProgramCommit commands. In other embodiments, there may be different command names and types that also provide simultaneous programming commands. In one embodiment, a variety of commands can be used with the BeingAddressed, OpenAddressed, and SecureAddressed states (e.g., Write, BlockWrite, and Lock commands). In one embodiment, a Write command writes data to Tag memory. In one embodiment, a BlockWrite command writes multiple 16-bit words to Tag memory. In other embodiments, BlockWrite word size can be 8-bit, 32-bit, or other length. In one embodiment, a Lock command locks passwords and prevents subsequent writes using a locked password. A lock command may also lock individual memory banks to prevent subsequent writes to a particular memory bank.

In one embodiment, the Interrogator 101 can send multiple programming commands to a group of Tags and Tags can receive and process multiple programming commands. In one embodiment, the multiple programming commands may be committed to memory or executed after the success of the set of multiple programming commands is verified. In alternate embodiments, each programming command is committed to memory or executed by the Tag immediately upon receipt of the command.

For example, the Interrogator 101 may send commands A, B, C, and D to Tag group 1-100. A, B, C, and D may represent programming commands sent to every Tag in the group of 100 Tags such that Tag 1 receives the programming commands A, B, C, and D and commits or executes all four programming commands, and Tag 2 receives the commands A, B, C, and D etc. In one embodiment, verification of the multiple programming commands is tracked with a Command Counter as discussed in greater detail below. When a Tag misses one of the programming commands, the missing command can be resent to the Tag. Alternatively, the Interrogator may reset Tag memory and resend all programming commands in the set.

In one embodiment, the Interrogator 101 uses a predetermined exclusive handle to establish an I/O data link to Tags in the BeingAddressed state. For example, the handle may be a 16-bit number consisting of all 0s. This predetermined exclusive handle is used to send simultaneous programming commands to the Tags. Commands received by a Tag from a handle other than the exclusive handle are ignored and Tags will not act on programming commands unrelated to simultaneous programming.

In one embodiment, Tags capable of receiving simultaneous programming commands do not require a handle to receive simultaneous programming commands. In one embodiment, Tags in a BeingAddressed, OpenAddressed, or SecureAddressed state ignore commands sent with a handle other than an exclusive simultaneous programming handle.

Verify Programming Success

A group of simultaneously programmed Tags may automatically and simultaneously respond to a simultaneous programming such that the responses collide with each other making individual replies difficult for the Interrogator 101 to identify. In one embodiment, the success of the simultaneous programming is verified for each Tag. Verification may also incorporate checking a command counter as detailed below. Individual verification of Tags ensures that the Interrogator 101 receives an intelligible response from each Tag. In one embodiment, the Interrogator 101 verifies data programmed to a Tag by issuing a verification command to each of the Tags individually. A verification command returns a response from a Tag indicating whether the programming of a Tag was successful. If a Tag programming command was unsuccessful or the Interrogator 101 does not receive a response, the Tag is added back into the queue of Tags to program. The Interrogator 101 retries failed or unknown status Tags by resending the programming command in a subsequent round of simultaneous programming.

Verification With Command Counters Overview

In one embodiment, Tag memory includes a Command Counter (CmdCounter) and the Interrogator 101 memory includes an Interrogator Command Counter ICCounter to track whether Tags have received a complete set of programming commands. For example, if 10 programming commands are sent to a Tag, the Tag can adjust (e.g., increment) the CmdCounter 10 times (once for each programming command sent). In one embodiment, each Tag can automatically increment (or otherwise adjust) their respective CmdCounter upon receipt or execution of a programming command. After the last (e.g., $10^{th}$) programming command is sent, the Interrogator 101 can verify that each Tag's CmdCounter matches the number of programming commands sent (as indicated by an ICCounter specific to the respective Tag). If, for example the CmdCounter is not equal to the ICCounter (e.g., less than 10 adjustments were recorded in both), an error notification can be provided (e.g., on a display of the Interrogator 101). Upon determination of an error, the process of programming the Tag may restart from the initial programming comment or may continue from the last verifiable programming command.

Tag Command Counters

Tags can implement a CmdCounter to track received or executed programming commands. In one embodiment, before a Tag processes a programming command, the CmdCounter is initialized to a default value. For example, the CmdCounter may be set to 0 (or some other initialization setting). In other embodiments, the Interrogator does not reset or change the CmdCounter, and instead reads the current CmdCounter value (and stores the value into the ICCounter) in order to track the number of programming commands seen by the Tag.

The CmdCounter can be automatically adjusted (incremented or decremented) with each received programming command. Alternatively, explicit initialization (or reset) of the CmdCounter can be avoided or skipped by the Interrogator 101 recording the pre-programming state of the CmdCounter and internally keeping track (e.g., in a saved memory location) of the initial value of the CmdCounter. The Interrogator 101 can record the number of programming commands sent to a Tag and adjust the initial value of the ICCounter accordingly.

For example, if a Tag has a CmdCounter with possible values of 1-100, the Interrogator 101 can first read the current CmdCounter value of the Tag (e.g., 35), and track the number of programming commands sent to the Tag (e.g., 5). For each programming command sent to a Tag, the Interrogator 101 can adjust the CmdCounter value (e.g., starting at 35 plus or minus 1). Upon sending the last programming command (or during the verification process), the Interrogator 101 can compare the ICCounter (e.g., stored or tracked on the Interrogator 101) with the CmdCounter value at the Tag. If the values are equal, then the programming commands may be marked as successful. In other embodiments, the final values can be unequal if the number of iterations or adjustments applied to the CmdCounter and ICCounter are equal.

In one embodiment, a Tag's CmdCounter is adjusted (e.g., incremented or decremented) automatically upon receipt of a programming command. In other embodiments, a Tag receives an explicit CmdCounter adjustment command after, before, or simultaneously with receiving a programming command.

Interrogator Command Counters

The Interrogator 101 can store in memory, an Interrogator Command Counter (ICCounter), and adjust the ICCounter upon sending each programming command to a Tag for a sequence of programming commands. As used herein, the sequence of programming commands to be counted can include all programming commands sent after the BeingAddressed indicator is set and before the BeingAddressed indictor is reset.

The ICCounter can be Tag specific. For example, the Interrogator 101 can maintain a separate ICCounter for each Tag (e.g., an ICCounter may be associated with a particular Tag ID). The Interrogator 101 can adjust the CmdCounter of the Tag before, during, or after sending a programming command. In some embodiments, the Interrogator 101 sends an explicit CmdCounter command to the Tag, and adjusts the ICCounter after sending this explicit command Adjustments at the ICCounter may mirror adjustments made to the CmdCounter. For example, if the CmdCounter is decremented (e.g., subtract 1 from the CmdCounter) for each programming command, a mirrored decrement value is applied to the ICCounter (e.g., subtract 1 from the ICCounter). If the CmdCounter is incremented (e.g., add 1 to the CmdCounter) for each programming command, a mirrored increment value is applied to the ICCounter (e.g., add 1 to the ICCounter).

Tag and Interrogator Counter Comparison

In one embodiment, after completion of a sequence of programming commands (e.g., all programming commands are sent by the Interrogator or received at the Tag), the Interrogator 101 can verify the number of programming commands each Tag received by comparing the CmdCounter with the ICCounter. When all programming commands have been successfully recorded at the Tag, the ICCounter and the CmdCounter will be equal or in sync (e.g., the same number of increments or decrements have been applied equally to the ICCounter and the CmdCounter). For example, with initial CmdCounter and ICCounter values of 0, and after 5 programming commands, both the CmdCounter and ICCounter can have an equal value of 5 if the Tag successfully recorded all programming commands. When the CmdCounter and ICCounter are not equal in value, an error notification may be displayed on the Interrogator 101 or sent to another reporting mechanism. For example, with initial CmdCounter and ICCounter values of 0, and after 5 programming commands, if the CmdCounter value is 4 and the ICCounter value is 5 a programming error may have occurred.

The ICCounter can be associated with a specific Tag such that when a Tag misses or fails to processes a programming command, the Interrogator 101 can mark the Tag to be reprogrammed (if possible). Resending all programming commands to the Tag may reprogram Tags. If the Tag cannot be reprogrammed the Interrogator 101 can send a command to mark or flag the Tag as defective or possibly corrupt so that future reads of the Tag memory can be notified.

Reset BeingAddressed Indicator

Upon verification that a Tag is successfully programmed with the correct data, the Interrogator 101 resets the BeingAddressed, OpenAddressed, or SecureAddressed state. In one embodiment, a Query or NAK command is sufficient to reset the BeingAddressed, OpenAddressed, or SecureAddressed state. In one embodiment, the Interrogator 101 switches from the BeingAddressed, OpenAddressed, or SecureAddressed state to another state (e.g., the ready or arbitrate state) after successfully programming a group of Tags. In one embodiment, the Interrogator 101 deactivates or deselects the BeingAddressed indicator upon verification that a Tag has been successfully programmed.

In one embodiment, the Interrogator 101 also locks the Tag's memory before resetting or transitioning from the BeingAddressed, OpenAddressed, or SecureAddressed state. In one embodiment, the Interrogator 101 locks the Tag's memory after resetting or transitioning from the BeingAddressed, OpenAddressed, or SecureAddressed state.

Bulk Programming Unique Data

In one embodiment, the method for programming unique data is broken into multiple commands. A ProgramSetup command establishes individual Tag addressing and provides data to be programmed individually for each of the specified Tags. A ProgramCommit command causes the Tags to program (commit) the addressed data to Tag memory.

In one embodiment, the ProgramSetup command individually addresses and sends data to each Tag in a group of specified Tags. For example, with a group of ten Tags, Tag 1 would receive a ProgramSetup command addressed to Tag 1, Tag 2 would receive a ProgramSetup command addressed to Tag 2 and so on. Interrogator 101 issues individual of the ProgramSetup commands for every Tag in a specified group of Tags until each Tag has been addressed and data has been sent to the specified Tag address. In one embodiment, the ProgramSetup data sent to each Tag in a group can be unique data (e.g., a unique serial number). In one embodiment, the ProgramSetup command specifies a Tag's memory bank and data to be stored in the memory bank. In one embodiment, the ProgramSetup command addresses individual Tags based on their serial number or unique Tag ID.

In one embodiment, the ProgramSetup command causes each individual Tag to temporarily hold data in one or more flip flops or latches while power is continuously applied to the Tag. In one embodiment, specified Tags fully commit the data to memory when a programming interval is received. In one embodiment, the Interrogator 101 issues the ProgramCommit command to maintains power for a programming interval in order to commit data sent by the ProgramSetup command. As discussed above, Tags may have different required durations to fully commit data to Tag memory. In one embodiment, the Interrogator 101 holds power for at least twenty microseconds in order to program Tags completely. In one embodiment, the Interrogator 101 selects a programming interval based on the specific Tag type determined in the initial inventory phase. In one embodiment, a programming interval commits data to non-volatile memory so that another Interrogator can access the data at a future point in time.

Figure 4:
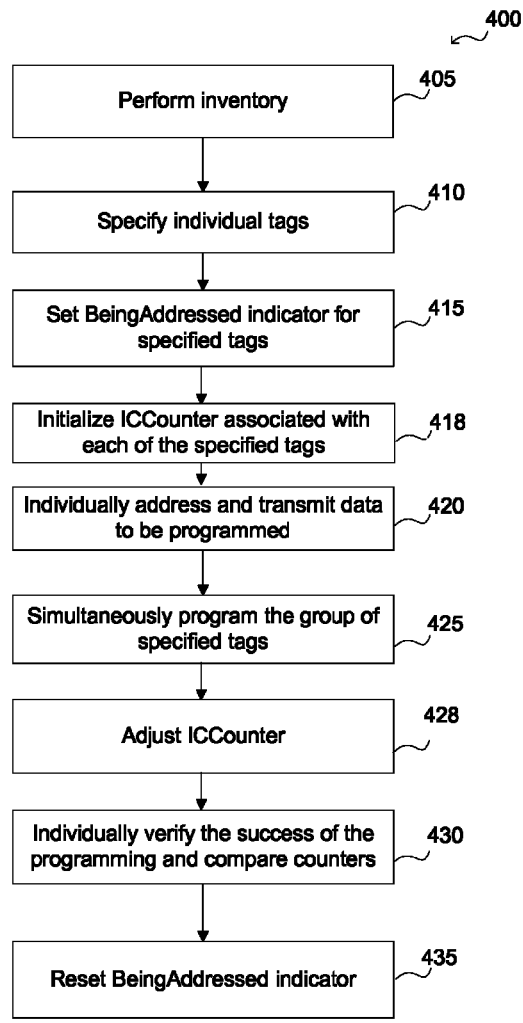
FIG. 4 illustrates a flowchart representation of one embodiment of a method of simultaneously programming individually addressed data to each Tag in a group of Tags.

FIG. 4 illustrates a flowchart representation of one embodiment of a method of simultaneously programming individually addressed data to each Tag in a group of Tags. At block 405, the Interrogator 101 performs an inventory on a population of Tags.

At block 410, the Interrogator 101 specifies a group of Tags from the entire inventory population. In one embodiment, the Interrogator 101 specifies a group of Tags from the initial population of Tags. In one embodiment, the Interrogator 101 successively programs groups of Tags until all inventoried Tags are successfully programmed.

At block 415, the Interrogator 101 sets the BeingAddressed indicator for each of the Tags to be programmed in the specified group of Tags.

At block 418, the Interrogator 101 initializes the ICCounter as described above. The Interrogator 101 may also send a command to the specified group of Tags to cause the Tags to initialize or reset their internal CmdCounter. Alternatively, the Interrogator 101 may read the current CmdCounter and use the current CmdCounter value as the starting value of the ICCounter.

At block 420, the Interrogator 101 provides data to be programmed to each specified Tag in the group of specified Tags. In one embodiment, the Interrogator 101 provides data to be programmed individually to each Tag until every specified Tag in the group has received the data to be programmed.

At block 425, the Interrogator 101 provides a command to simultaneously program all the specified group of Tags. In one embodiment, the Interrogator 101 holds a programming interval for a specified duration of time while the group of Tags program data to memory.

At block 428, the Interrogator 101 optionally sends a command to adjust the CmdCounter for each of the specified Tags. In one embodiment, the Tags automatically increment their CmdCounter after successful receipt of a programming command in block 425.

At block 430, the Interrogator 101 individually verifies that the programming command was successful for each of the individual Tags in the specified group. The Interrogator 101 may also compare the ICCounter with the CmdCounter to verify each Tag successfully received all programming commands.

At block 435, the Interrogator 101 resets the "group addressing" indicator for all of the Tags in the specified group of Tags. Optionally, the Interrogator 101 resets the CmdCounter for all of the Tags in the specified group of Tags. In one embodiment, the CmdCounter is reset after verification that the Tags that have successfully received all programming commands.

Bulk Programming Identical Data

BulkProgram commands are sent at the same time as the programming interval. In one embodiment, a BulkProgram command includes a destination memory bank, the data to be programmed and programming interval. The Interrogator 101 determines the duration of the programming interval as described above. In one embodiment, BulkProgram commands are received and processed by Tags in a BeingAddressed, OpenAddressed, or SecureAddressed state. In one embodiment, a Tag with an active/set BeingAddressed indicator can receive BulkProgram commands.

Figure 5:
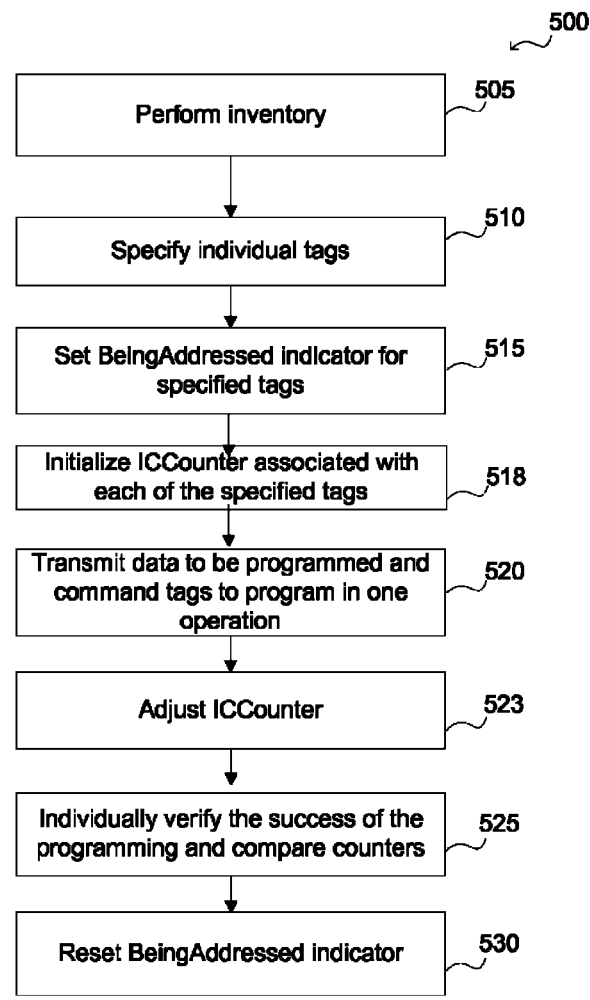
FIG. 5 illustrates a flowchart representation of one embodiment of a method of simultaneously programming a group of specified Tags with identical data.

FIG. 5 illustrates a flowchart representation of one embodiment of a method of simultaneously programming a group of specified Tags with identical data. At block 505, the Interrogator 101 performs an inventory on a population of Tags.

At block 510, the Interrogator 101 specifies a group of Tags from the inventory population.

At block 515, the Interrogator 101 sets the BeingAddressed indicator for each of the Tags to be programmed in the specified group of Tags.

At block 518, the Interrogator 101 initializes the ICCounter as described above. The Interrogator 101 may also send a command to the specified group of Tags to cause the Tags to initialize or reset their internal CmdCounter. Alternatively, the Interrogator 101 may read the current CmdCounter and use the current CmdCounter value as the starting value of the ICCounter.

At block 520, the Interrogator 101 sends the simultaneous programming command to the entire group of specified Tags. In one embodiment, the simultaneous programming command contains data to be programmed and holds power for a specified programming interval.

At block 523, the Interrogator 101 optionally sends a command to adjust the CmdCounter for each of the specified Tags. In one embodiment, the Tags automatically increment their CmdCounter after successful receipt of a programming command in block 520.

At block 525, the Interrogator 101 individually verifies that the programming command was successful for each of the individual Tags in the specified group. The Interrogator 101 may also compare the ICCounter with the CmdCounter to verify each Tag successfully received all programming commands.

At block 530, Interrogator 101 resets the BeingAddressed indicator for all of the Tags in the specified group of Tags. Optionally, the Interrogator 101 resets the CmdCounter for all of the Tags in the specified group of Tags. In one embodiment, the CmdCounter is reset after verification that the Tags that have successfully received all programming commands.

Figure 6:
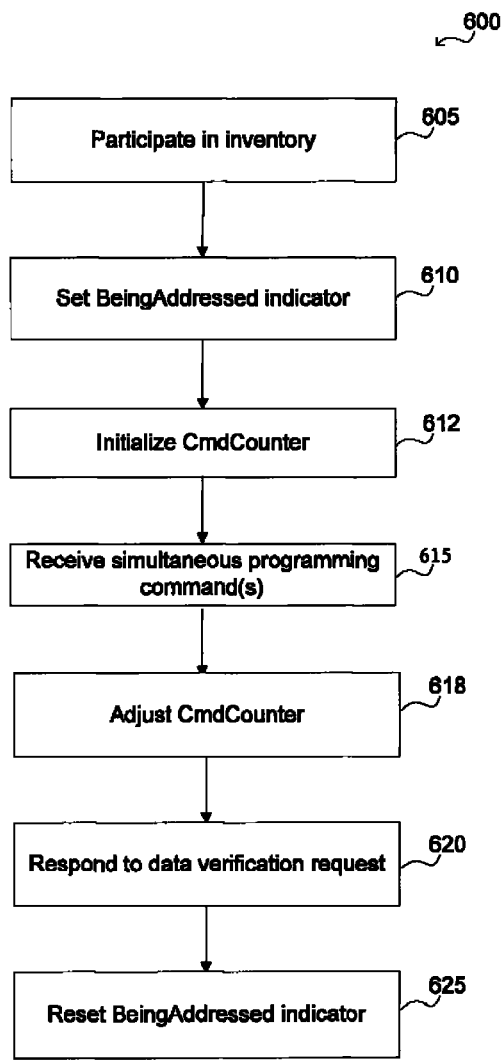
FIG. 6 illustrates a flowchart representation of one embodiment of a Tag implemented method for participating in simultaneous programming.

FIG. 6 illustrates a flowchart representation of one embodiment of a Tag implemented method for participating in simultaneous programming. At block 605, the Tag participates in an inventory.

At block 610, the Tag receives a command to set its BeingAddressed indicator and performs internal logic to set the BeingAddressed indicator.

At block 612, the Tag receives a command to initialize its CmdCounter.

At block 615, the Tag receives one or more simultaneous programming commands described above.

At block 618, the Tag adjusts its CmdCounter based on the receipt of one or more simultaneous programming commands. For example, for each programming command received, the Tag can increment the CmdCounter so that the number of received programming commands can be tracked. In other implementations, the CmdCounter starts at the total number of programming commands that will be sent, and decrements the CmdCounter until the CmdCounter reaches 0 or some other number indicating all commands have been received. In some embodiments, the adjustment of the CmdCounter automatically occurs at block 615 when the Tag receives a simultaneous programming command.

At block 620, the Tag receives a command to verify the success of the simultaneous programming command and sends back a response to the verification command.

At block 625, the Tag receives a command resetting its BeingAddressed indicator and performs internal logic to reset the BeingAddressed indicator.

At block 625, the Tag optionally resets or re-initializes the CmdCounter to an initial state. For example, if the Cmd-Counter is setup to increment from 0, the CmdCounter is reset to 0. In alternate embodiments, the CmdCounter is initialized before any programming commands are sent Various embodiments and aspects of the inventions have been described above, and the accompanying drawings will illustrate the various embodiments. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

The foregoing embodiments of the invention may be described as a process that is usually depicted as a flowchart, a flow diagram, a structure diagram or a block diagram. Although a flowchart may describe the operations as a sequential process, many of the operations may be rearranged. The process is terminated when its operations are completed. A process may correspond to a method, a program, a procedure, etc.

What is claimed is:

1. An apparatus to identify and program tags, the apparatus comprising:
   a transmitter;
   a receiver; and
   a microprocessor configured to:
      transmit a first set of commands to prepare a plurality of specified tags to receive a second set of commands, wherein the first set of commands comprises initializing a command counter in each of the specified tags,
      transmit a second set of commands, wherein the second set of commands causes each of the plurality of specified tags to receive a programming command to program data into the prepared tags' memory, and wherein the receiving the programming command causes the prepared tag to adjust the command counter, and
      to verify that at least the second set of commands are excuted by the tag using the command counter.

2. The apparatus of claim 1, wherein the microprocessor is further configured to individually verify the success of the programming command by comparing the command counter of each tag to a number of programming commands sent to each tag.

3. The apparatus of claim 1, wherein a second command counter is adjusted when the second set of commands are transmitted.

4. The apparatus of claim 1, wherein the first set of commands further comprises setting an addressed state in each of the plurality of specified tags, and wherein the setting the addressed state allows the specified tags to simultaneously receive the programming commands.

5. The apparatus of claim 1, wherein the second set of commands comprises a plurality of programming commands for each of the plurality of specified tags.

6. The apparatus of claim 1 operating in a frequency range of about 900 megahertz.

7. The apparatus of claim 1, further comprising a network interface.

8. The apparatus of claim 1, wherein the first set of commands includes a handshake sequence.

9. The apparatus of claim 1, further comprising a near field loop antenna coupled to at least one of the transmitter or receiver.

10. An apparatus to identify and program tags, the apparatus comprising:
    a transmitter;
    a receiver; and
    a microprocessor configured to:
       transmit a set of commands to specify a plurality of tags, wherein the set of commands comprises initializing a command counter in each of the plurality of tags,
       transmit a programming command to the plurality of tags, wherein the programming command simultaneously programs data to a memory of the plurality of tags, and wherein the programming command causes each of the plurality of tags to adjust the command counter, and
       to verify that the set of commands are executed by the tag using the command counter.

11. The apparatus of claim 10, wherein the microprocessor is further configured to individually verify the success of the programming command by comparing the command counter of each tag to a number of programming commands sent to each tag.

12. The apparatus of claim 10, wherein the microprocessor is further configured to determine the programming command was unsuccessful in programing a tag and add the unsuccessfully programmed tag to a programming queue.

13. The apparatus of claim 10, wherein the specified plurality of tags further comprises changing an addressed state of the plurality of tags, and wherein changing of the addressed state of the plurality of tags allows for simultaneous programing of the plurality of tags.

14. The apparatus of claim 13, wherein the programming command comprises a plurality of programs commands for each of the plurality of specified tags.

15. The apparatus of claim 10 operating in a frequency range of about 900 megahertz.

16. The apparatus of claim 10, wherein the microprocessor is a microcontroller.

17. The apparatus of claim 10, further comprising dynamic random access memory and a memory controller that controls the operation of the memory.

18. The apparatus of claim 10, further comprising a directional coupler.

19. The apparatus of claim 10, further comprising a network interface.

20. The apparatus of claim 10, wherein the set of commands includes a handshake sequence.

21. A tag comprising:
    a receiver to detect a signal representing a command;
    a memory containing a state of being addressed; and
    a processor coupled with the receiver and the memory, the processor configured to:

activate an addressed state on the tag, wherein the addressed state allows other tags to be promoted to an addressed state while the tag remains in the addressed state, and initialize a command counter that is used to verify that a complete set of programming commands are executed by the tag, wherein the command counter is incremented when the tag receives a programming command.

22. The tag of claim 21, wherein the addressed state allows for processing simultaneous programming commands by a plurality of tags.

23. The tag of claim 21, wherein the processor is further configured to receive simultaneous programming commands that are transmitted using an exclusive handle.

24. The tag of claim 21, further comprising an antenna coupled to the receiver to receive a radio frequency signal from a reader.

25. The tag of claim 21, wherein the tag is a single integrated circuit.

26. The tag of claim 21, wherein simultaneous programming commands are addressed to tags with one of a unique serial number or a unique tag identification number.

* * * * *